(12) United States Patent
Ross et al.

(10) Patent No.: US 7,127,402 B2
(45) Date of Patent: Oct. 24, 2006

(54) METHOD AND APPARATUS FOR CONVERTING UTTERANCE REPRESENTATIONS INTO ACTIONS IN A CONVERSATIONAL SYSTEM

(75) Inventors: Steven I. Ross, S. Hamilton, MA (US); Elizabeth A. Brownholtz, Andover, MA (US); Jeffrey G. MacAllister, Chestnut Hill, MA (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/044,760

(22) Filed: Jan. 10, 2002

(65) Prior Publication Data

US 2002/0138266 A1    Sep. 26, 2002

Related U.S. Application Data

(60) Provisional application No. 60/261,372, filed on Jan. 12, 2001.

(51) Int. Cl.
*G10L 15/00* (2006.01)
(52) U.S. Cl. ............... 704/275; 704/270; 704/231
(58) Field of Classification Search .............. 704/1, 704/231, 270, 275
See application file for complete search history.

(56) References Cited

U.S. PATENT DOCUMENTS

| | | | |
|---|---|---|---|
| 4,729,096 A | 3/1988 | Larson | |
| 4,736,296 A | 4/1988 | Katayama et al. | .......... 364/419 |
| 4,914,590 A | 4/1990 | Loatman et al. | |
| 5,101,349 A | 3/1992 | Tokuume et al. | |
| 5,239,617 A | 8/1993 | Gardner et al. | |
| 5,282,265 A | 1/1994 | Rohra Suda et al. | |
| 5,383,121 A | 1/1995 | Letkeman | |
| 5,386,556 A | 1/1995 | Hedin et al. | |
| 5,390,279 A * | 2/1995 | Strong | ................. 704/200 |
| 5,642,519 A | 6/1997 | Martin | |
| 5,677,835 A | 10/1997 | Carbonell et al. | |
| 5,678,052 A | 10/1997 | Brisson | ................. 395/754 |
| 5,748,841 A | 5/1998 | Morin et al. | ............. 395/2.66 |

(Continued)

FOREIGN PATENT DOCUMENTS

WO    WO 99/05671    2/1999

OTHER PUBLICATIONS

McGlashan, S., "Towards Multimodal Dialog Management" Jun. 1996, Proceedings of Twente Workshop on Language Technology, 11, pp. 1-7.*

(Continued)

*Primary Examiner*—V. Paul Harper

(57) ABSTRACT

A conversation manager processes a spoken utterance from a user of a computer that is directed to an application program hosted on the computer. The conversation manager includes a reasoning facility which accesses goal-directed rules stored in a rules base (e.g., database). The reasoning facility also has access to a conversational record that includes a record of previous utterances and a semantic analysis for each utterance. The reasoning facility processes a representation of the utterance by using the goal-directed rules. The reasoning facility uses means-end analysis to determine the proper rules to execute, and thus the script calls to make to achieve the goal of processing the utterance. While processing the utterance, the reasoning facility attempts to resolve any ambiguities in the representation of the utterance and to fill in any missing information that is needed to achieve its goal. The reasoning facility then generates a response to the utterance, which can be a question to the user or a command to the application program based on the utterance.

20 Claims, 5 Drawing Sheets

U.S. PATENT DOCUMENTS

| | | | |
|---|---|---|---|
| 5,812,977 A | 9/1998 | Douglas | |
| 5,864,819 A | 1/1999 | De Armas et al. | |
| 5,867,817 A | 2/1999 | Catallo et al. | |
| 5,873,064 A | 2/1999 | DeArmas et al. | |
| 5,918,222 A | 6/1999 | Fukui et al. | |
| 5,937,385 A * | 8/1999 | Zadrozny et al. | 704/257 |
| 5,960,384 A | 9/1999 | Brash | 704/9 |
| 6,023,669 A | 2/2000 | Suda et al. | |
| 6,044,347 A * | 3/2000 | Abella et al. | 704/272 |
| 6,073,102 A | 6/2000 | Block | |
| 6,138,100 A | 10/2000 | Dutton et al. | |
| 6,192,110 B1 | 2/2001 | Abella et al. | |
| 6,192,339 B1 | 2/2001 | Cox | |
| 6,208,972 B1 | 3/2001 | Grant et al. | |
| 6,233,559 B1 | 5/2001 | Balakrishnan | |
| 6,311,159 B1 | 10/2001 | Van Tichelen et al. | |
| 6,314,402 B1 | 11/2001 | Monaco et al. | |
| 6,334,103 B1 | 12/2001 | Surace et al. | |
| 6,466,654 B1 | 10/2002 | Cooper et al. | |
| 6,519,562 B1 | 2/2003 | Phillips et al. | |
| 6,542,868 B1 | 4/2003 | Badt et al. | |
| 6,604,075 B1 | 8/2003 | Brown et al. | |
| 6,647,363 B1 | 11/2003 | Claassen | |
| 6,721,706 B1 | 4/2004 | Strubbe et al. | |
| 6,728,692 B1 | 4/2004 | Martinka et al. | |
| 6,748,361 B1 | 6/2004 | Comerford et al. | |

OTHER PUBLICATIONS

MSDN Online Web Workshop, Active Accessibility Support [online]. [retrieved on May 30, 2001], Retrieved from the Internet (URL: http://msdn.microsoft.com/workshop/browser/accessibility/overview/overview.asp) (6 pages).

Spoken Language Dialog Systems, pp. 1-2, Nov. 15, 2000, http://www.mrig.edu.au/ltg/slp803D/class/Jones/overview.html (downloaded May 16, 2001).

* cited by examiner

METHOD AND APPARATUS FOR CONVERTING UTTERANCE REPRESENTATIONS INTO ACTIONS IN A CONVERSATIONAL SYSTEM

RELATED APPLICATIONS

This application claims the benefit of U.S. Provisional Application No. 60/261,372, filed Jan. 12, 2001. This application is related to U.S. application Ser. No. 09/931,505, filed Aug. 16, 2001, U.S. Application filed Oct. 25, 2001 entitled "System and Method for Relating Syntax and Semantics for a Conversational Speech Application," concurrently filed U.S. Application entitled "Method and Apparatus for Performing Dialog Management in a Computer Conversational Interface," and concurrently filed U.S. Application entitled "System and Method for Deriving Natural Language Representation of Formal Belief Structures." The entire teachings of the above applications are incorporated herein by reference.

BACKGROUND OF THE INVENTION

Speech enabling mechanisms have been developed that allow a user of a computer system to verbally communicate with the computer system. Examples of speech recognition products that convert speech into text strings that can be utilized by software applications on a computer system include the ViaVoice™ product from IBM®, Armonk, N.Y., and NaturallySpeaking Professional from Dragon Systems, Newton, Mass. In particular, a user may communicate through a microphone with a software application that displays output from the application in a window on the display screen of the computer system.

A computer can include a speech recognition or natural language processing system that receives or recognizes utterances and decides what to do with them. Traditionally, a number of such processing systems transform an utterance directly into script commands. For command and control systems, these utterances typically represent commands that require the system to take some form of action. An action typically consists of a call to one or more script functions which accomplishes something on the user's computer or elsewhere (e.g., on another computer over a network).

Other speech recognition systems typically treat interactions with a user as a form-filling exercise, or treat conversation as a script or decision tree walk. In a form-filling system, the system can accept utterances and respond to the user as long as the user speaks utterances that match the predetermined layout of the form. In a decision tree system, the system can accept utterances and respond as long as the user provides utterances that match those predefined for the decision tree and thus enable the user to move through the predetermined decision tree.

SUMMARY OF THE INVENTION

One approach to processing utterances from the user of a computer, as described above, transforms an utterance directly into script commands. One example of such an approach is described in copending, commonly assigned U.S. patent application Ser. No. 09/342,937, filed Jun. 29, 1999, entitled "Method and Apparatus for Translation of Common Language Utterances into Computer Application Program Commands," the teachings of which are incorporated herein by reference. Systems using this approach typically have no other representation for the utterance or the actions that they are taking, and thus they effectively may not have an understanding of what they are doing or why they are doing it. To get a conversation to occur in such a system, the conversation typically must be embedded in the script calls themselves.

In another approach described earlier, speech processing systems typically treat interactions as a form-filling exercise, or treat conversation as a script or decision tree walk. The approach of the present invention differs in that a system configured according to the present invention can be said to have an understanding of what has been said to it and have an awareness of what it is doing. The present invention provides an intermediate representation between the text of the input utterance and the script of the output actions that allows for a more reflective and intelligent interpretation of inputs and determination of outputs. In addition, the use of rules in this interpretation phase provides a much more modular representation of the actions available to the system and their preconditions and effects, so that these actions can be used automatically as needed anywhere in the response process.

The approach of the invention to this problem is to first generate a semantic representation of the utterance. One such approach, suitable for use with the invention is described in copending, commonly assigned U.S. patent application Ser. No. 10/004,289 filed Oct. 25, 2001, entitled "System and Method for Relating Syntax and Semantics for a Conversational Speech Application" the teachings of which are incorporated herein by reference. In such an approach, a speech center system feeds the semantic representation into a reasoning facility for processing. The reasoning facility includes a goal-directed rule-based inference engine. The rules in this system specify how to make particular script calls in order to achieve specific goals. Through means-end analysis, the inference engine of the reasoning facility finds rules that can achieve the initial goal of processing the utterance, and then proceeds to create and pursue subgoals that will enable it to apply those rules. While processing the utterance, the reasoning facility attempts to resolve any ambiguities in the representation of the utterance and to fill in any missing information that is needed to achieve its goal and any subgoals. If successful, this inference procedure achieves the goal of processing the utterance, and, in the course of doing so, the proper script calls have been made.

In one aspect of the present invention, an apparatus and method is provided for converting an utterance representation into a response. The apparatus includes a database storing a set of goal-directed rules, and a digital processor coupled to the database. The digital processor hosts and executes a reasoning facility that is configured to generate a goal derived from the utterance representation and to analyze the utterance representation based on the goal and the set of goal-directed rules in the database. In general, the goal-directed rules determine the response to the utterance representation (command or question). In particular, the reasoning facility is configured to identify ambiguous information in the utterance representation, and to generate a response based on the analysis of the ambiguous information.

In one aspect the reasoning facility applies a goal-directed reasoning analysis based on the set of goal-directed rules to clarify the ambiguous information.

In another aspect, the reasoning facility accesses data in a conversational record of related utterances to clarify the ambiguous information.

The reasoning facility, in another aspect, generates a question directed to the provider of the utterance representation to clarify the ambiguous information or request additional information which was not provided. The question emerges from the analysis of the utterance representation based on goal-directed seeking of the information required to achieve the goal of processing the utterance. Thus, a conversational dialog between the user and the computer can emerge from the analyses provided by the reasoning facility of utterances spoken by the provider.

The reasoning facility, in a further aspect, generates the computer application program command based on the utterance representation and based on the analysis of the ambiguous information.

In another aspect, the utterance representation is based on a set of propositions, each proposition comprising an attribute, an object, and a value.

In a further aspect, each goal-directed rule comprises a set of conditions and a set of actions, each condition consisting of a proposition or a script command and each action consisting of a proposition or a script command.

In another aspect, the response is a computer application program command based on the utterance representation

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
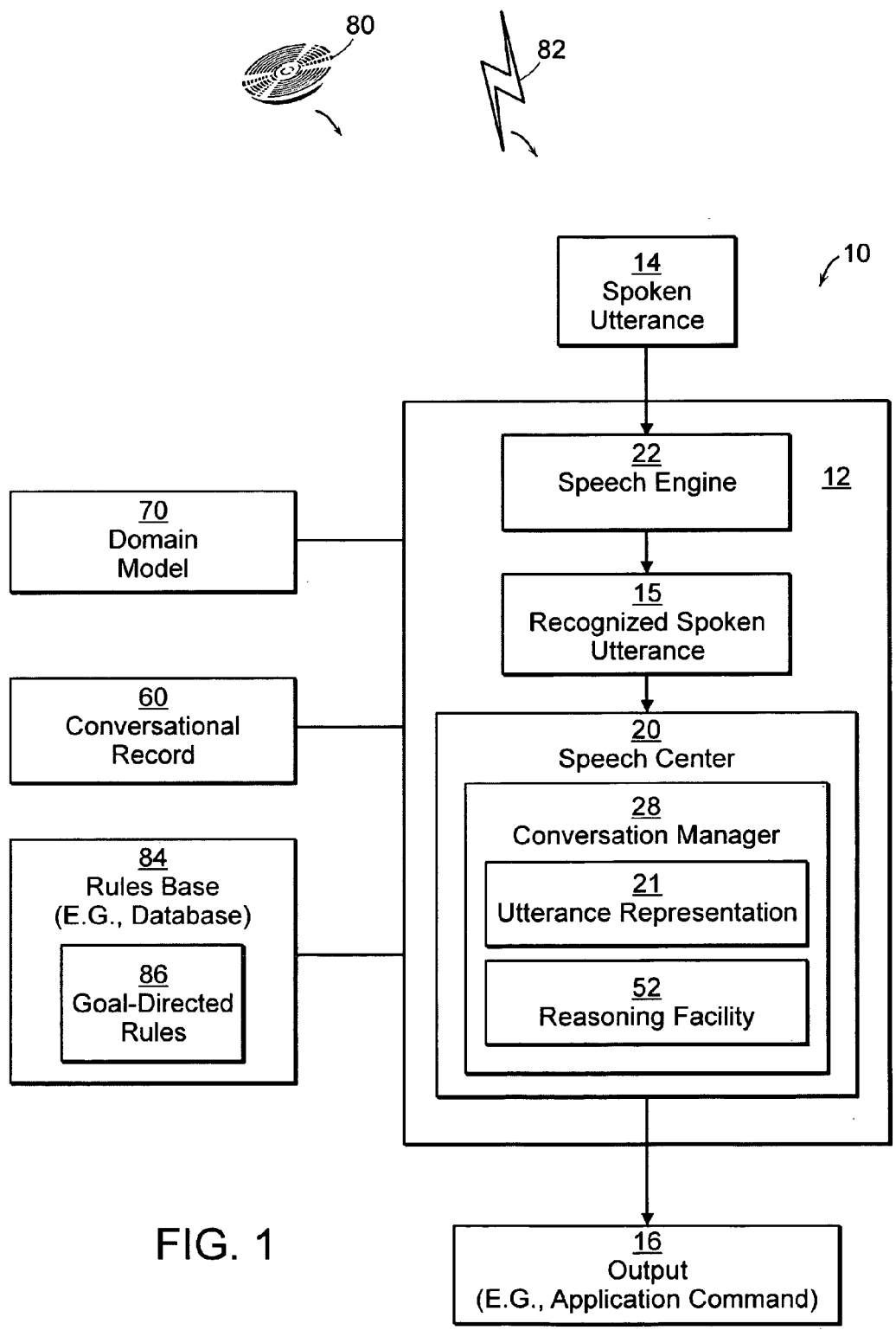
FIG. 1 is a block diagram of a preferred embodiment of the present invention in a computer system.
Figure 2:
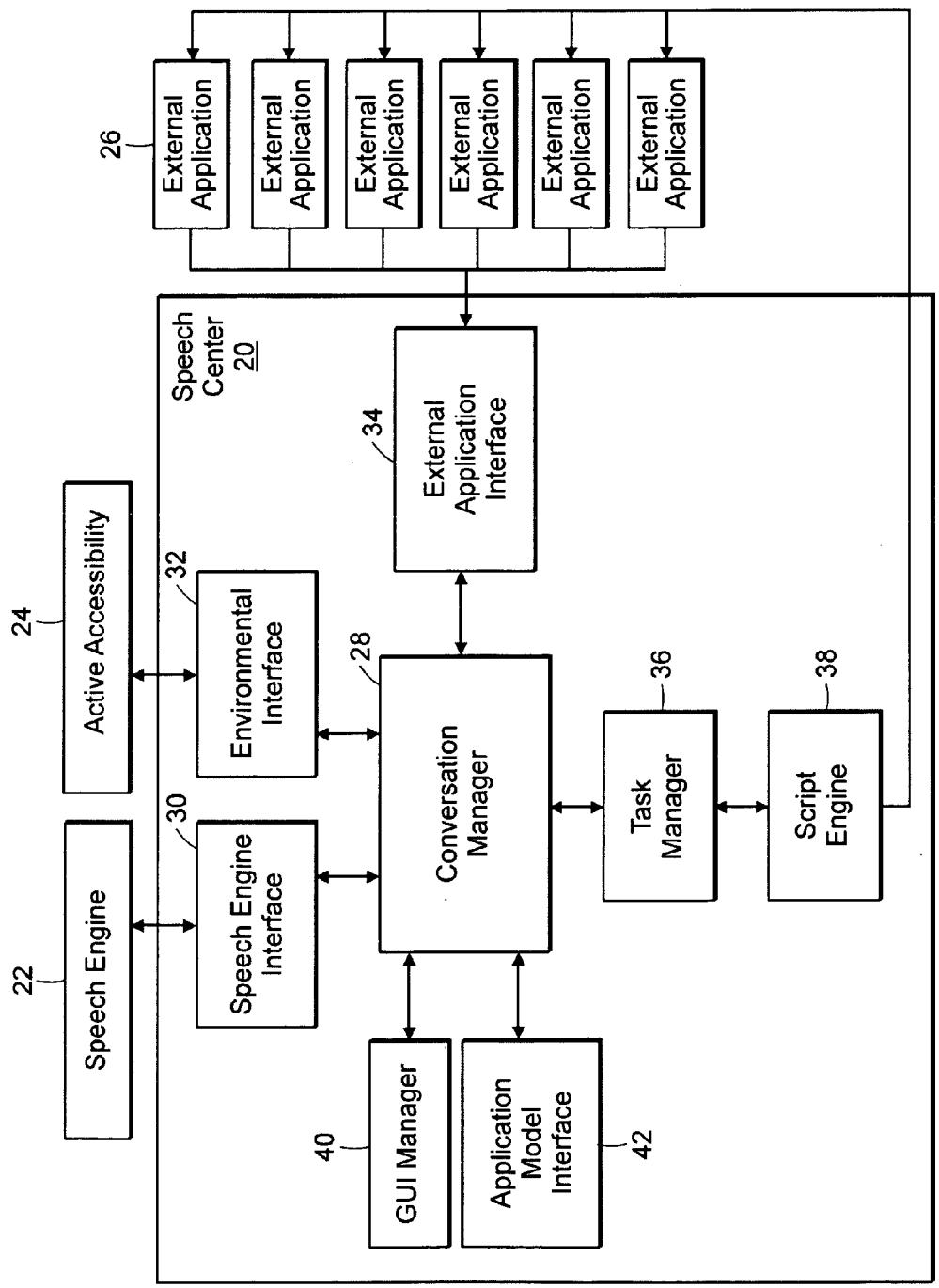
FIG. 2 is a block diagram of the components of the speech center system illustrated in FIG. 1.

A description of preferred embodiments of the invention follows. FIG. 1 is an illustration of a preferred embodiment in a computer system 10. Generally, the computer system 10 includes a digital processor 12 which hosts and executes a speech center system 20, speech engine 22, and conversation manager 28 in working memory. The input spoken utterance 14 is a voice command or other audible speech input provided by a user of the computer system 10 (e.g., when the user speaks into a microphone connected to the computer system 10) based on common language words. In one embodiment, the input 14 is not necessarily spoken, but is based on some other type of suitable input, such as phrases or sentences typed into a computer keyboard. The recognized spoken utterance 15 is a spoken utterance 14 that is recognized as a valid utterance by the speech engine 22. The utterance representation 21 is an internal representation of the recognized spoken utterance produced by the speech center system 20. The speech center system 20 includes a conversation manager 28, which includes a reasoning facility 52 that performs a goal-directed reasoning analysis based on the utterance representation 21. The speech center system 20 also includes a rule base 84 and goal-directed rules 86 used by the reasoning facility 52. The output 16 consists of one or more commands or other output based on the recognized spoken utterance 15 and which is directed to the speech enabled external application 26 (see. FIG. 2) selected by the conversation manager 28.

Figure 3:
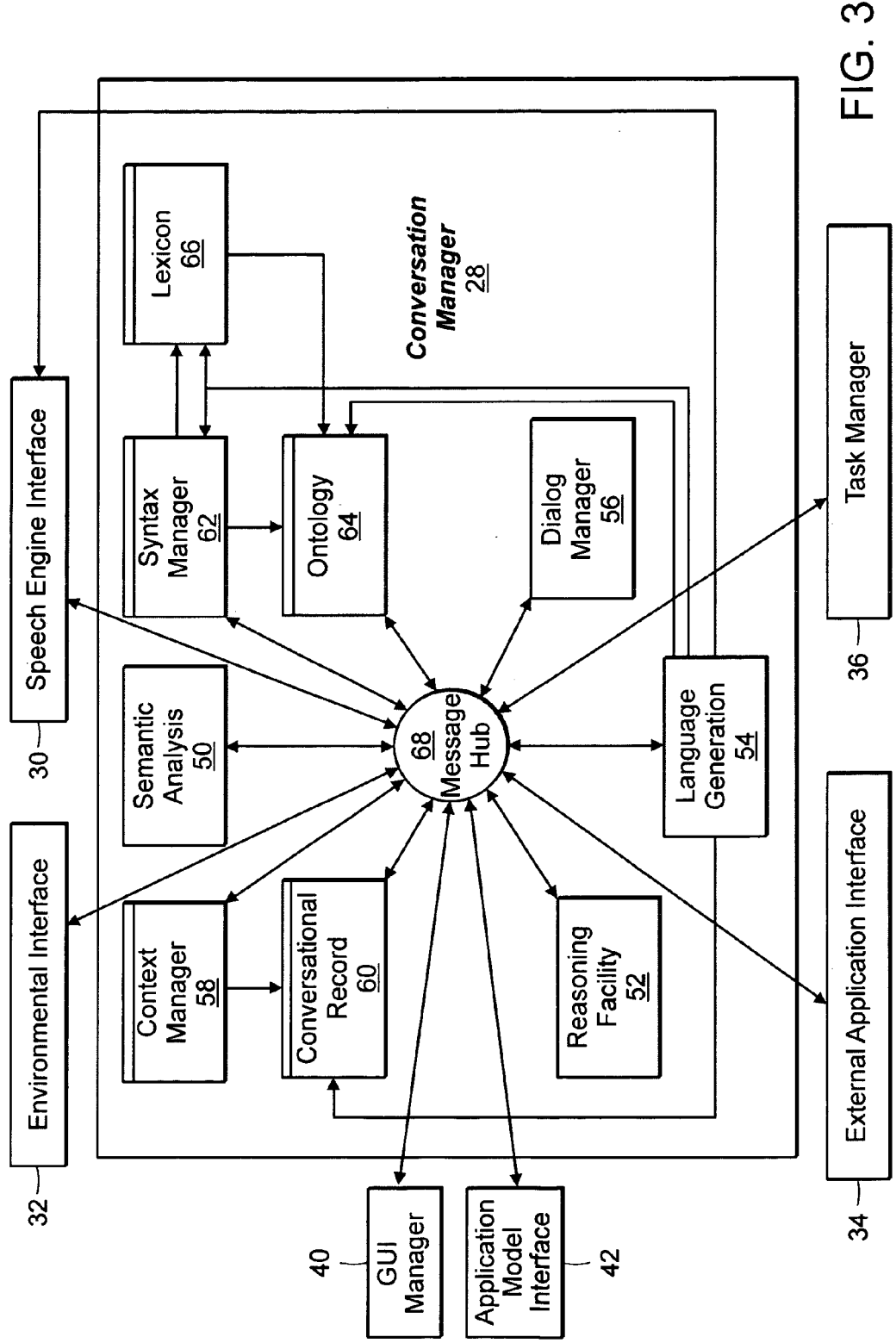
FIG. 3 is a block diagram of the components of the conversation manager illustrated in FIG. 2.

In one embodiment, a computer program product 80, including a computer usable medium (e.g., one or more CDROM's, diskettes, tapes, etc.), provides software instructions for the conversation manager 28 or any of its components, such as the reasoning facility 52 (see FIG. 3). The computer program product 80 may be installed by any suitable software installation procedure, as is well known in the art. In another embodiment, the software instructions may also be downloaded over an appropriate connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the conversation manager 28 or any of its components, such as the reasoning facility 52 (see FIG. 3). In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer useable medium of the computer program product 80 is a propagation medium that the computer may receive and read, such as by receiving the propagation medium and identifying a propagated signal embodied in the propagation medium, as described above for the computer program propagated signal product 82.

FIG. 2 shows the components of a speech center system 20 configured according to the present invention. FIG. 2 also illustrates external applications 26 that communicate with the speech center 20, a speech engine 22, and an active accessability module 24. The speech center 20, speech engine 22, active accessability module 24, and external applications 26, in one aspect of the invention, may be hosted on one computer system 10. In another embodiment, one or more of the external applications 26 may be hosted and executed by a different digital processor 12 than the digital processor 12 that hosts the speech center 20. Generally, the speech center 20 (and its individual components) may be implemented as hardware or software. The speech center 20 includes a conversation manager 28, speech engine interface 30, environmental interface 32, external application interface 34, task manager 36, script engine 38, GUI manager 40, and application module interface 42.

The speech engine interface module 30 encapsulates the details of communicating with the speech engine 22, isolating the speech center 20 from the speech engine 22 specifics. In a preferred embodiment, the speech engine 22 is ViaVoice™ from IBM®.

The environmental interface module 32 enables the speech center 20 to keep in touch with what is happening on the user's computer. Changes in window focus, such as dialogs popping up and being dismissed, and applications 26 launching and exiting, must all be monitored in order to interpret the meaning of voice commands. A preferred embodiment uses Microsoft® Active Accessibility® (MSAA) from Microsoft Corporation, Redmond, Wash., to provide this information, but again flexibility to change this or incorporate additional information sources is desirable.

The script engine 38 enables the speech center 20 to control applications 26 by executing scripts against them. The script engine 38 provides the following capabilities: The script engine 38 supports cross-application scripting via OLE (Object Linking and Embedding) automation or through imported DLL's (Dynamic Link Libraries). It is capable of executing arbitrary strings representing well formed script engine 38 statements. This enables the speech center 20 to easily compose calls to respective application operations and invoke them. The script engine 38 environment also allows the definition of new subroutines and functions that combine the primitive functionality provided by applications 26 into actions that more closely correspond to those that a user might talk about. While the speech center 20 is a script-enabled application, this does not mean that the applications 26 that it controls needs to be script-enabled. In the preferred embodiment, the script engine 38 is a LotusScript engine from IBM, and so long as an application 26 provides an OLE automation or DLL interface, it will be controllable by the speech center 20. In other embodiments, the script engine 38 is a Visual Basic, Javascript, or any other suitable scripting engine.

The task manager 36 controls script execution through the script engine 38. The task manager 36 provides the capability to proceed with multiple execution requests simultaneously, to queue up additional script commands for busy applications 26, and to track the progress of the execution, informing the clients when execution of a script is in progress or has completed.

The external application interface 34 enables communications from external applications 26 to the speech center 20. For the most part, the speech center 20 can operate without any modifications to the applications 26 it controls, but in some circumstances, it may be desirable to allow the applications 26 to communicate information directly back to the speech center 20. The external application interface 34 is provided to support this kind of push-back of information. This interface 34 allows applications 26 to load custom grammars, or define task specific vocabulary. The external application interface 34 also allows applications 26 to explicitly tap into the speech center 20 for speech recognition and synthesis services.

The application model interface 42 provides models for applications 26 communicating with the speech center 20. The power of the speech center 20 derives from the fact that it has significant knowledge about the applications 26 it controls. Without this knowledge, it would be limited to providing little more than simplistic menu based command and control services. Instead, the speech center 20 has a detailed model (e.g., as part of the domain model 70) of what a user might say to a particular application 26, and how to respond. That knowledge is provided individually on an application 26 by application 26 basis, and is incorporated into the speech center 20 through the application model interface 42.

The GUI manager 40 provides an interface to the speech center 20. Even though the speech center 20 operates primarily through a speech interface, there will still be some cases of graphical user interface interaction with the user. Recognition feedback, dictation correction, and preference setting are all cases where traditional GUI interface elements may be desirable. The GUI manager 40 abstracts the details of exactly how these services are implemented, and provides an abstract interface to the rest of the speech center 20.

The conversation manager 28 is the central component of the speech center 20 that integrates the information from all the other modules 30, 32, 34, 36, 38, 40, 42. In a preferred embodiment, the conversation manager 28 is not a separate component, but is the internals of the speech center 20. Isolated by the outer modules from the speech engine 22 and operating system dependencies, it is abstract and portable. When the spoken utterance 15 is recognized, the conversation manager 28 converts the utterance 15 into an utterance representation 21 and combines an analysis of the utterance representation 21 with information on the state of the desktop and remembered context from previous recognitions to determine the intended target of the spoken utterance 15. The utterance 15 is then translated into the appropriate script engine 38 calls and dispatched to the target application 26. The conversation manager 28 is also responsible for controlling when dictation functionality is active, based on the context determined by the environmental interface 32.

FIG. 3 represents the structure of the conversation manager 28 in a preferred embodiment. Each of the functional modules, such as the semantic analysis module 50, reasoning facility module 52, language generation module 54, and dialog manager 56, are indicated by plain boxes without a bar across the top. Data abstraction modules, such as the context manager 58, the conversational record 60, the syntax manager 62, the ontology module 64, and the lexicon module 66 are indicated by boxes with a bar across the top. The modules 52 through 68 of the conversation manager 28 are described below.

The message hub 68 includes message queue and message dispatcher submodules. The message hub 68 provides a way for the various modules 30, 32, 34, 36, 40, 42, and 50 through 64 to communicate asynchronous results. The central message dispatcher in the message hub 68 has special purpose code for handling each type of message that it might receive, and calls on services in other modules 30, 32, 34, 36, 40, 42, and 50 through 64 to respond to the message. Modules 30, 32, 34, 36, 40, 42, and 50 through 64 are not restricted to communication through the hub. They are free to call upon services provided by other modules (such as 30, 32, 34, 36, 40, 42, 52, 54, 56, 58, 60, 62, 64 or 66) when appropriate.

The context manager module 58 keeps track of the targets of previous commands, factors in changes in the desktop environment, and uses this information to determine the target of new commands. One example of a context manager 58 suitable for use with the invention is described in copending, commonly assigned U.S. patent application Ser. No. 09/931,505, filed Aug. 16, 2001, entitled "System and Method for Determining Utterance Context in a Multi-Context Speech Application," the entire teachings of which are incorporated herein by reference.

The domain model 70 is a model of the "world" (e.g., concepts, one or more grammatic specifications, and a semantic specification) of one or more speech-enabled applications 26. In one embodiment, the domain model 70 is a foundation model including base knowledge common to many applications 26. In a preferred embodiment, the domain 70 is extended to include application specific knowledge in an application domain model for each external application 26.

In a conventional approach, all applications 26 have an implicit model of the world that they represent. This implicit model guides the design of the user interface and the functionality of the program. The problem with an implicit model is that it is all in the mind of the designers and developers, and so is often not thoroughly or consistently implemented in the product. Furthermore, since the model is not represented in the product, the product cannot act in accordance with the model's principles, explain its behavior in terns of the model, or otherwise be helpful to the user in explaining how it works.

In the approach of the present invention, the speech center system 20 has an explicit model of the world (e.g., domain model 70) which will serve as a foundation for language understanding and reasoning. Some of the basic concepts that the speech center system 20 models using the domain model 70 are:

| | |
|---|---|
| Things | A basic category that includes all others |
| Agents | Animate objects, people, organizations, computer programs |
| Objects | Inanimate objects, including documents and their sub-objects |
| Locations | Places in the world, within the computer, the network, and within documents |
| Time | Includes dates, as well as time of day. |
| Actions | Things that agents can do to alter the state of the world |
| Attributes | Characteristics of things, such as color, author, etc. |
| Events | An action that has occurred, will occur, or is occurring over a span of time. |

These concepts are described in the portion of the domain model 70 known as the ontology 64 (i.e., based on an ontological description). The ontology 64 represents the classes of interest in the domain model 70 and their relationships to one another. Classes may be defined as being subclasses of existing classes, for example. Attributes can be defined for particular classes, which associate entities that are members of these classes with other entities in other classes. For example, a person class might support a height attribute whose value is a member of the number class. Height is therefore a relation which maps from its domain class, person, to its range class, number.

Although the ontology 64 represents the semantic structure of the domain model 70, the ontology 64 says nothing about the language used to speak about the domain model 70. That information is contained within the syntax specification. The base syntax specification contained in the foundation domain model 70 defines a class of simple, natural language-like sentences that specify how these classes are linked together to form assertions, questions, and commands. For example, given that classes are defined as basic concepts, a simple form of a command is as follows:

template command(action)
<command>=<action> thing(action.patient)? manner(action)*.

Based on the ontology definitions of actions and their patients (the thing acted upon by an action) and on the definition of the thing and manner templates, the small piece of grammar specification shown above would cover a wide range of commands such as "move down" and "send this file to Kathy".

To describe a new speech-enabled application 26 to the conversation manager 28, a new ontology 64 for that application 26 is provided that describes the kinds of objects, attributes, and operations that the application 26 makes available. To the extent that these objects and classes fit into the built-in domain model hierarchy, the existing grammatical constructs apply to them as well. So, if an application 26 provides an operation for, say, printing it could specify:

print is a kind of action.
file is a patient of print.

and commands such as "print this file" would be available with no further syntax specification required.

The description of a speech-enabled application 26 can also introduce additional grammatical constructs that provide more specialized sentence forms for the new classes introduced. In this way, the description includes a model of the "world" related to this application 26, and a way to talk about it. In a preferred embodiment, each supported application 26 has its own domain model 70 included in its associated "application module description" file (with extension "apm").

The speech center 20 has a rudimentary built-in notion of what an "action" is. An "action" is something that an agent can do in order to achieve some change in the state of the world (e.g., known to the speech center 20 and an application 26). The speech center 20 has at its disposal a set of actions that it can perform itself. These are a subclass of the class of all actions that the speech center 20 knows about, and are known as operations. Operations are implemented as script functions to be performed by the script engine 38. New operations can be added to the speech center 20 by providing a definition of the function in script, and a set of domain rules that describe the prerequisites and effects of the operation.

By providing the speech center system 20 with what is in effect "machine readable documentation" on its functions, the speech center 20 can choose which functions to call in order to achieve its goals. As an example, the user might ask the speech center system 20 to "Create an appointment with Mark tomorrow." The speech center 20 uses the reasoning facility 52 (to be described in more detail later) to search through its available rules 86 to find one that states that it can create an appointment. Examining the rule description, the reasoning facility 52 of the speech center 20 finds that it calls a function which has the following parameters: a person, date, time, and place. The reasoning facility 52 then sets up goals to fill in these parameters, based on the information already available. The goal of finding the date will result in the location of another rule 86 which invokes a function that can calculate a date based on the relative date "tomorrow" information. The goal of finding a person results in the location of a rule 86 that will invoke a function which will attempt to disambiguate a person's full name from their first name. The goal of finding the time will not be satisfiable by any rules 86 that the reasoning facility 52 knows about, and so a question to the user will be generated to get the information needed. Once all the required information is assembled, the appointment creation function is called and the appointment scheduled.

One of the most important aspects of the domain model 70 is that it is explicitly represented and accessible to the speech center system 20. Therefore, it can be referred to for help purposes and explanation generation, as well as being much more flexible and customizable than traditional programs.

The foundation domain model 70 contains a set of grammatical specifications that defines base classes such as numbers, dates, assertions, commands and questions. These specifications are preferably in an annotated form of Backus Naur Form (BNF), that are further processed by the syntax manager 62 rather than being passed on directly to the speech engine interface 30. For example, a goal is to support a grammatic specification for asserting a property for an object in the base grammar. In conventional Backus Naur Form (BNF), the grammatic specification might take the form:

<statement>=<article><attribute> of <object> is <value>.

This would allow the user to create sentences like "The color of A1 is red" or "The age of Tom is 35". The sample conventional BNF does not quite capture the desired meaning, however, because it doesn't relate the set of legal attributes to the specific type of the object, and it doesn't relate the set of legal values to the particular attribute in question. The grammatic specification should not validate a statement such as "The age of Tom is red", for example. Likewise, the grammatic specification disallows sentences that specify attributes of objects that do not possess those attributes. To capture this distinction in BNF format in the grammatic specification would require separate definitions for each type of attribute, and separate sets of attributes for each type of object. Rather than force the person who specifies the grammar to do this, the speech center system 20 accepts more general specifications in the form of syntax templates, which will then be processed by the syntax manager module 62, and the more specific BNF definitions are created automatically. The syntax template version of the above statement would look something like this:

template statement(object)
   attribute=object % monoattributes
   <statement>=<article> attribute of <object> is <attribute.range>.

This template tells the syntax manager 62 how to take this more general syntax specification and turn it into BNF based on the ontological description or information (i.e., ontology 64) in the domain model 70. Thus, the grammatical specification is very tightly bound to the domain model ontology 64. The ontology 64 provides meaning to the grammatical specifications, and the grammatical specifications determine what form statements about the objects defined in the ontology 64 may take.

Given a syntax specification, an ontology 64, and a lexicon 66, the syntax manager 62 generates a grammatic specification (e.g., BNF grammar) which can be used by the speech engine 22 to guide recognition of a spoken utterance 14. The grammatical specification is automatically annotated with translation information which can be used to convert an utterance recognized by the grammatic specification to a set of script calls to the frame building functions of the semantics analysis module 50.

Referring to FIG. 3, the lexicon 66 implements a dictionary of all the words known to the speech center system 20. The lexicon 66 provides synonyms and parts of speech information for elements of the ontological description for the domain model 70. The lexicon 66 links each word to all the information known about that word, including ontology classes (e.g., as part of the ontology 64) that it may belong to, and the various syntactic forms that the word might take.

The conversation manager 28 converts the utterance 15 into an intermediate form or utterance representation 21 that is more amenable to processing. The translation process initially converts recognized utterances 15 into sequences of script calls to frame-building functions via a recursive substitution translation facility. One example of such a facility is described in U.S. patent application Ser. No. 09/342,937, filed Jun. 29, 1999, entitled "Method and Apparatus for Translation of Common Language Utterances into Computer Application Program Commands," the entire teachings of which are incorporated herein by reference. When these functions are executed, they build frames within the semantic analysis module 50 which serve as an initial semantic representation of the utterance 15. The frames are then processed into a series of attribute-object-value triples, which are termed "propositions". Frame to attribute-object-value triple translation is mostly a matter of filling in references to containing frames. These triples are stored in memory, and provide the raw material upon which the reasoning facility 52 operates. A sentence such as "make this column green" would be translated to a frame structure by a series of calls like these:

```
Begin ("command")
    AssociateValue ("action")
    Begin ("action")
        AssociateClass ("make")
        AssociateValue ("patient")
        Begin ("thing")
            AssociateClass ("column")
        End ("thing")
        AssociateValue ("destination")
            AssociateParameter ("green")
    End ("action")
End ("command")
```

After the frame representation of the sentence is constructed, it is converted into a series of propositions, which are primarily attribute-object-value triples. A triple X Y Z can be read as "The X of Y is Z" (e.g., the color of column is green). The triples derived from the above frame representation are shown in the example below. In this example, the words with numbers appended to them in the example represent anonymous objects introduced by the speech center system 20.

Class Command-1 Command
   Class Action-1 Make
   Action Command-1 Action-1
   Class Thing-1 Column
   Patient Action-1 Thing-1
   Destination Action-1 Green The set of triples generated from the sentence serve as input to the reasoning facility 52, which is described below. Note that while much has been made explicit at this point, not everything has. The reasoning facility 52 still must determine which column to operate upon, for example.

Conversational speech is full of implicit and explicit references back to people and objects that were mentioned earlier. To understand these sentences, the speech center system 20 looks at the conversational record 60, and finds the missing information. Each utterance is indexed in the conversational record 60, along with the results of its semantic analysis. The information is eventually purged from the conversational record when it is no longer relevant to active goals and after some predefined period of time has elapsed.

For example, after having said, "Create an appointment with Mark at 3 o'clock tomorrow," a user might say, "Change that to 4 o'clock." The speech center system 20 establishes that a time attribute of something is changing, but needs to refer back to the conversational record 60 to find the appointment object whose time attribute is changing. Usually, the most recently mentioned object that fits the requirements will be chosen, but in some cases the selection of the proper referent is more complex, and involves the goal structure of the conversation.

The dialog manager 56 serves as a traffic cop for information flowing back and forth between the reasoning facility 52 and the user. Questions generated by the reasoning facility 52 as well as answers derived to user questions and unsolicited announcements by the speech center system 20 are all processed by the dialog manager 56. The dialog manager 56 also is responsible for managing questionanswering grammars, and converting incomplete answers generated by the user into a form digestible by the reasoning facility 52.

The dialog manager 56 has the responsibility for deciding whether a speech center-generated response should be visible or audible. It also decides whether the response can be presented immediately, or whether it must ask permission first. If an operation is taking more than a few seconds, the dialog manager 60 generates an indication to the user that the operation is in progress.

When questions or responses to the user are derived by the reasoning facility 52, they must be translated back into natural language by the language generation module 54. In a preferred embodiment, the language generation module 54 takes advantage of the knowledge stored in the syntax manager 62, domain model 70, lexicon 66, and conversational record 60 in order to generate natural language output. In one embodiment, the language generation module 54 generates language from the same syntax templates used for recognition, or from additional templates provided specifically for language generation. Rules 86 in the rule base 84 will decide which template is appropriate for the language generation task at hand.

Figure 4:
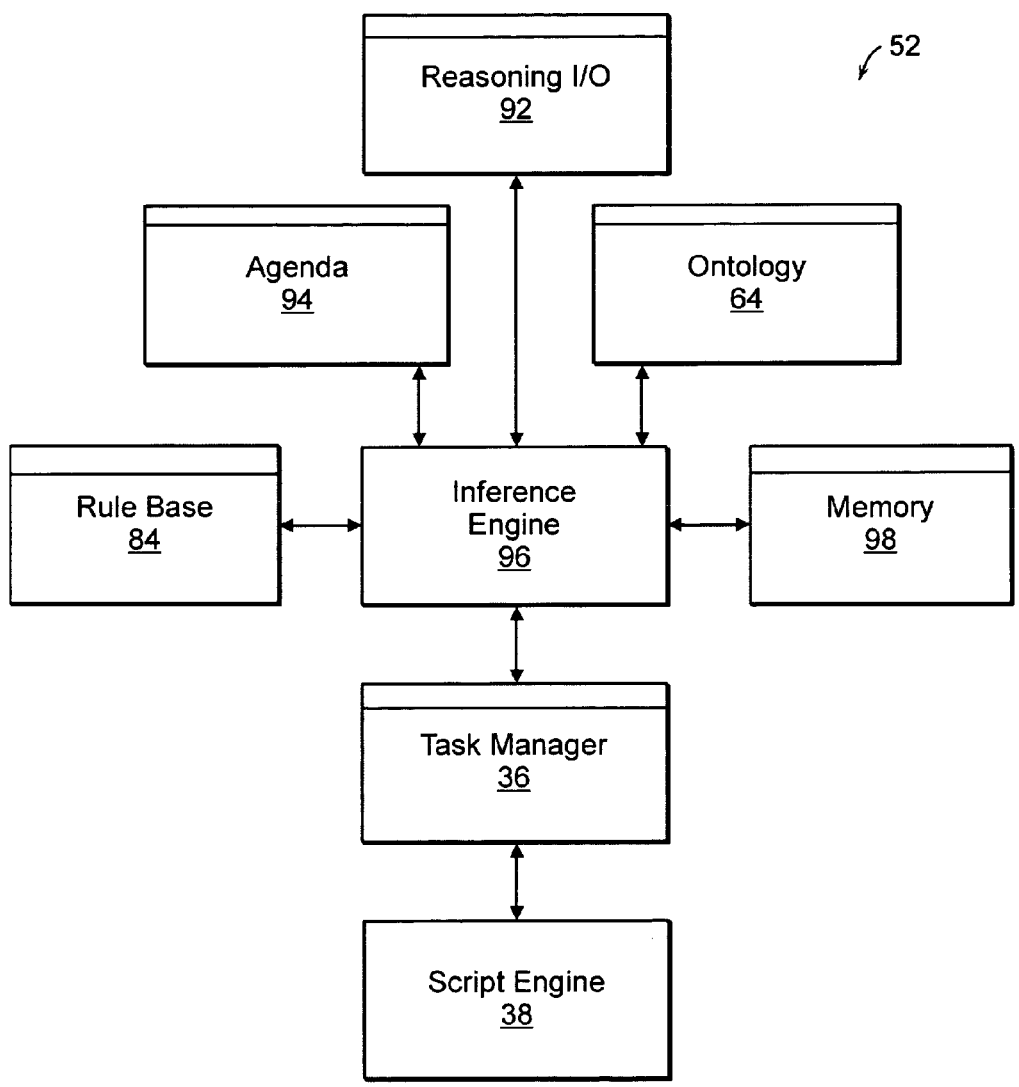
FIG. 4 is a block diagram of the components of the reasoning facility, according to a preferred embodiment of the invention.

FIG. 4 is a block diagram of the components of the reasoning facility 52, according to a preferred embodiment of the invention. The central component of the reasoning facility 52 is the inference engine 96. It is the active component in the reasoning system 52. The inference engine 96 has access to a number of resources that provide it with the information it needs to do its job. The first of these is the rule base 84, in which the internal representation of the rules are stored. The second is the memory 98 for the inference engine 96, which stores the current set of beliefs. In one embodiment, the memory 98 is a data storage structure for the inference engine 96, which is stored in a RAM (random access memory) or working memory associated with the digital processor 12. Another component is the agenda 94, which keeps track of and organizes the reasoning process. The reasoning facility 52 makes use of the ontology 64 object, for resolving questions of object classification. The ontology object 64 is also used outside of the reasoning system 52 by the syntax manager 62 and semantics module 50. The reasoning facility 52 also has a connection to the script engine 38 through the task manager 36, allowing it to evaluate and execute script expressions. In one embodiment, these script expressions are LotusScript expressions. Thus, the reasoning facilty 52 has the capability to retrieve information from inside or outside of the speech center 20, and to take action that will impact the world beyond speech center 20. A reasoning I/O module 92 provides a means for clients to communicate beliefs and goals to the reasoning facility 52, and for the reasoning facility 52 to communicate results and questions back to the clients.

Rules 86 consist of some number of condition propositions and some number of action propositions. Each rule 86 represents a valid inference step that the reasoning facility 52 can take in the associated domain 70. A rule 86 states that when the condition propositions are satisfied, then the action propositions can be concluded. Both condition and action propositions can contain embedded script function calls, allowing the rules 86 to interact with both external applications 26 and other speech center 20 components. Goals are created in response to user requests, and may also be created by the inference engine 96 itself. A goal is a proposition that may contain a variable for one or more of its elements. The speech center system 20 then attempts to find or derive a match for that proposition, and find values for any variables.

To do so, the reasoning facility 52 scans through the rules 86 registered in the rule base 84, looking for ones whose actions unify with the goal. Once a matching rule 86 has been found, the rule's 86 conditions must be satisfied. These become new goals for the inference engine 96 of the reasoning facility 52 to achieve, based on the content of the memory and the conversational record. When no appropriate operations can be found to satisfy a goal, a question to the user will be generated. The reasoning facility 52 is primarily concerned with the determination of how to achieve the goals derived from the user's questions and commands.

In a preferred embodiment, a rule 86 stored in the rules base 84 consists of a number of conditions and a number of actions. Both conditions and actions are either propositions or script calls. As described earlier, propositions are attribute-object-value triples, the same representation used for representing the semantic content of an utterance.

If the reasoning facility 52 determines that the conditions of the rule 86 are satisfied, then the reasoning facility 52 can invoke the rule 86, and the actions specified by the rule 86 are executed. A sample rule is shown below:

Rule "open a message"
  if an action is an open
    and the action of a command is the action
    and the patient of the action is a message
    and the message is selected
  then OpenMessage( )
    and the command is executed
EndRule Rules 86 such as this are effectively machine-readable documentation for the script call that it contains. The rule 86 specifies the prerequisites for making the call, the call to make, and the effects that will result if the call is made. Thus, the reasoning facility 52 has the information it needs to decide what script calls to make in order to achieve its goal. In attempting to achieve the prerequisites for making this call, the reasoning facility 52 will find other rules 86, and make other script calls.

When a subgoal cannot be achieved by any of the rules 86 in the rules base 84, the reasoning facility 52 initiates a question to the user. Thus, ambiguous or missing information in the original utterance can result in a clarification dialog between the speech center system 20 and the user. Conversation emerges from the analysis of the reasoning facility 52, rather than being pre-programmed in.

Figure 5:
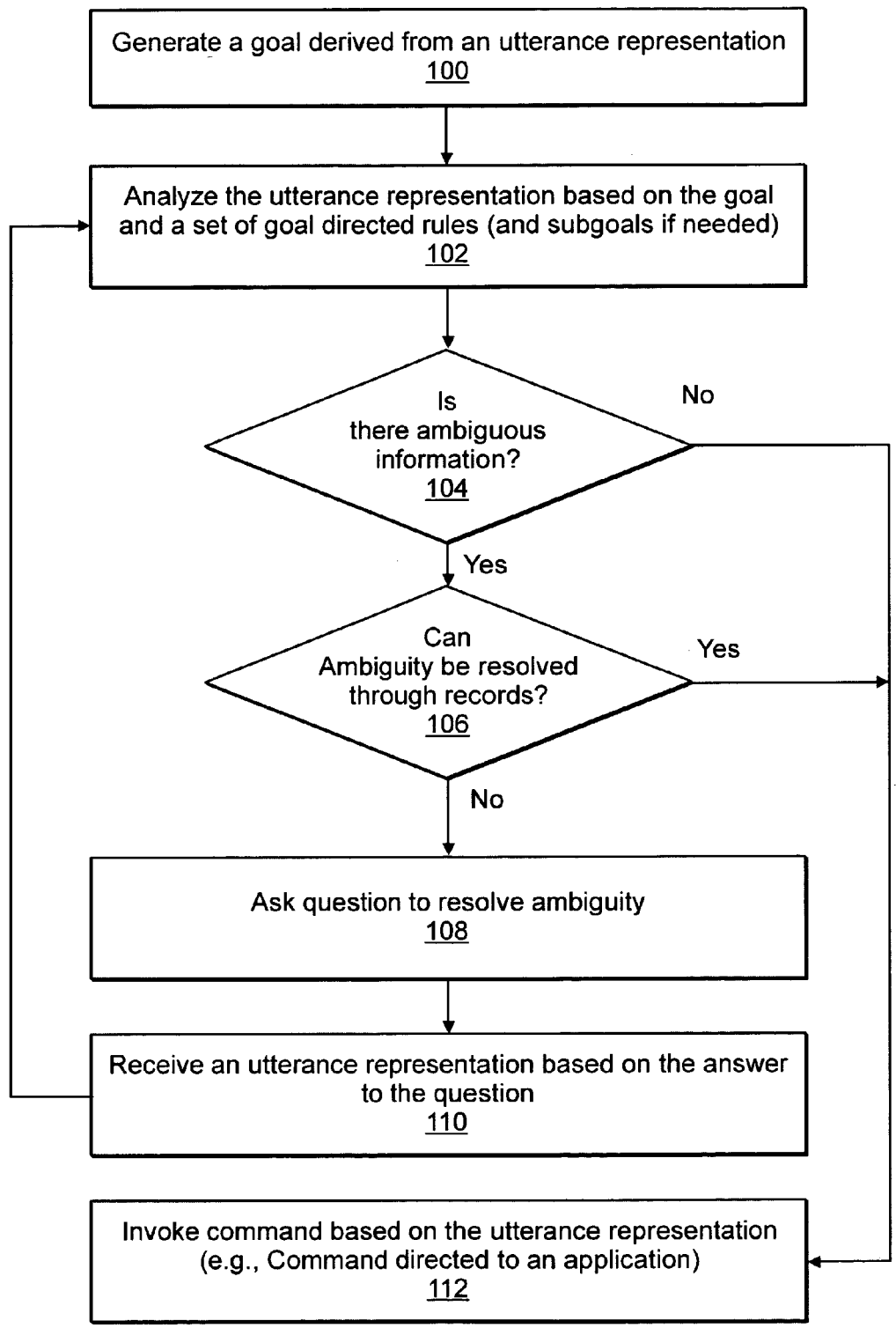
FIG. 5 is a flowchart of the process of analyzing an utterance representation according to the present invention.

FIG. 5 is a flowchart of the process of analyzing an utterance representation 21 according to the present invention. In step 100, the user generates a goal from an utterance representation 21 based on a spoken utterance 14 received from a user. The speech engine 22 receives the spoken utterance 14 from the user, and recognizes the spoken utterance 14 as a valid utterance, and thus produces the recognized spoken utterance 15. The speech center 20 receives the recognized spoken utterance 15, and the conversation manager 28 of the speech center 20 generates the utterance representation 21 as an internal representation of the recognized spoken utterance 15. For example, the user selects a message to be opened that is displayed on the screen of a computer, so that the user can read (or hear) the full message. In particular, the user speaks a verbal command such as "open the message from Jane." The reasoning facility receives an utterance representation 21 based on the spoken utterance 14 "open the message from Jane." The reasoning facility 52 sets a goal to open the message and attempts to achieve the prerequisites for making a call to select the message based on the message ID (identifier).

In step 102, the reasoning facility 52 analyzes the utterance representation 21 based on the goal and a set of goal-directed rules 86 in the rules base 84. The reasoning facility 52 determines that it must set a subgoal based on a rule 86 of determining the message ID for a person (e.g., "Jane").

In step 104, the reasoning facility 52 determines that there is ambiguous information (e.g., "Jane"), and in step 106, the reasoning facility 52 attempts to resolve the ambiguity through records or data available to it. For example, the reasoning facility 52 makes a call to query the name and address book in order to find a full name for the first name provided (e.g., "Jane"). The reasoning facility 52 can then set a subgoal based on a rule 86 of determining the full name for the first name. In a particular example, the reasoning facility 52 determines that there are two possible full names for "Jane," that is "Jane Doe" and "Jane Smith." For example, there may be message descriptions displayed for messages from both "Jane Doe" and "Jane Smith." The reasoning facility 52 then determines that it must disambiguate the name, "Jane."

In step 108, the reasoning facility 52 asks a question of the user to resolve the ambiguity. For example, the reasoning facility 52 can then initiate a question to the user to ask the user which "Jane" the user is interested in reading a message from. To summarize the goal selection process described in the example for steps 100 through 108, the reasoning facility 52 has set a series of goals as follows:

Process the utterance
Execute the command (open the message)
Select the message (so that it may be opened)
Get the ID of the message (so that it may be selected)
Get the name of the person (in order to get the message ID)
Disambiguate the name (by asking the user)
Listen for an answer (from the user)

In step 110, the reasoning facility 52 receives an utterance representation 21 based on the answer to the question asked in step 108. For example, the reasoning facility 52 receives the answer "Jane Smith." The reasoning facility 52 returns to step 102 to process the utterance representation 21 based on the previously set goals. For example, the reasoning facility 52 can disambiguate the name ("Jane"), determine that the information is no longer ambiguous (see step 104), and fulfill the other goals by proceeding to step 112.

In step 112, the reasoning facility 52 invokes a command (e.g., script call) based on the utterance representation 21. For example, the reasoning facility 52 invokes a call to open the message indicated by the message ID based on the full name of the person (e.g., "Jane Smith") and the determination that the information ("Jane") is no longer ambiguous (see step 104).

In step 106, in an alternate approach, the reasoning facility 52 determines that the ambiguity can be resolved through records or data available to the reasoning facility 52. For example, the reasoning facility 52 can determine which "Jane" the user has been interacting with, such as by referring to the conversational record 60 to determine that the user has been exchanging a series of messages with "Jane Smith" recently, and none recently with "Jane Doe." Thus, the reasoning facility 52 can proceed from step 106 to step 112 to invoke a command to open the message based on the name "Jane Smith" without asking a question of the user (without proceeding to step 108).

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer method for converting an utterance representation into a response, the computer method comprising the steps of:
   generating an application specific goal derived from the utterance representation, wherein the application specific goal and the utterance representation are propositions comprising attribute-object-value triples, the proposition corresponding to the utterance representation being derived from a frame representation;
   analyzing the utterance representation based on the application specific goal and a corresponding set of goal-directed rules to identify ambiguous information in the utterance representation or to generate a subgoal, each goal-directed rule representing a valid inference step from the goal-directed rule's condition to the application specific goal that may be taken in a domain associated with the application specific goal;
   generating a response based on the analysis of the utterance representation if ambiguous information is identified; and wherein the response is a computer application program command based on the utterance representation.

2. The computer method of claim 1 wherein the step of analyzing the utterance representation comprises applying a goal-directed reasoning analysis based on the set of goal-directed rules to clarify the ambiguous information.

3. The computer method of claim 2, wherein the step of analyzing the utterance representation comprises accessing data in a conversational record of related utterances to clarify the ambiguous information.

4. The computer method of claim 2, wherein the step of generating the response comprises generating a question directed to a provider of the utterance representation to clarify the ambiguous information, the question emerging from the analyzing of the utterance representation and requesting further information from the provider.

5. The computer method of claim 1, wherein the step of generating the response comprises generating the computer application program command based on the utterance representation and based on the analysis of the ambiguous information.

6. The computer method of claim 1, wherein each goal-directed rule comprises a set of conditions and a set of actions, each condition consisting of a first proposition or a first script command and each action consisting of a second proposition or a second script command.

7. An apparatus for converting an utterance representation into a response, comprising:
   a database storing a set of goal-directed rules;
   a digital processor coupled to the database, the digital processor hosting and executing a reasoning facility that is configured to:
      generate an application specific goal derived from the utterance representation, wherein the application specific goal and the utterance representation are propositions comprising attribute-object-value triples, the proposition corresponding to the utterance representation being derived from a frame representation;
      analyze the utterance representation based on the application specific goal and the set of goal-directed rules in the database to identify ambiguous information in the utterance representation or to generate a subgoal, each goal-directed rule representing a valid inference step from the goal-directed rule's condition to the application specific goal that may be taken in a domain associated with the application specific goal; and generate a response based on the analysis of the utterance representation if ambiguous information is identified.

8. The apparatus of claim 7 wherein the reasoning facility applies a goal-directed reasoning analysis based on the set of goal-directed rules to clarify the ambiguous information.

9. The apparatus of claim 8, wherein the reasoning facility accesses data in a conversational record of related utterances to clarify the ambiguous information.

10. The apparatus of claim 8, wherein the reasoning facility generates a question directed to a provider of the utterance representation to clarify the ambiguous information, the question emerging from the analysis of the utterance representation and requesting further information from the provider.

11. The apparatus of claim 7, wherein the reasoning facility generates the computer application program command based on the utterance representation and based on the analysis of the ambiguous information.

12. The apparatus of claim 7, wherein each goal-directed rule comprises a set of conditions and a set of actions, each condition consisting of a first proposition or a first script command and each action consisting of a second proposition or a second script command.

13. The apparatus of claim 7, wherein the response is a computer application program command based on the utterance representation.

14. A computer program product comprising:
a computer for converting an utterance representation into a response; and
a set of computer program instructions embodied on the computer readable medium, including instructions to:
generate an application specific goal derived from the utterance representation, wherein the application specific goal and the utterance representation are propositions comprising attribute-object-value triples, the proposition corresponding to the utterance representation being derived from a frame representation;
analyze the utterance representation based on the application specific goal and a corresponding set of goal-directed rules to identify ambiguous information in the utterance representation or to generate a subgoal, each goal-directed rule representing a valid inference step from the goal-directed rule's condition to the application specific goal that may be taken in a domain associated with the application specific goal;
generate a response based on the analysis of the utterance representation if ambiguous information is identified; and wherein the response is a computer application program command based on the utterance representation.

15. The computer program product of claim 14 wherein the set of computer instructions comprises further instructions to apply a goal-directed reasoning analysis based on the set of goal-directed rules to clarify the ambiguous information.

16. The computer program product of claim 15, wherein the set of computer instructions comprises further instructions to access data in a conversational record of related utterances to clarify the ambiguous information.

17. The computer program product of claim 15, wherein the set of computer instructions comprises further instructions to generate a question directed to a provider of the utterance representation to clarify the ambiguous information, the question emerging from the analysis of the utterance representation and requesting further information from the provider.

18. The computer program product of claim 14, wherein the set of computer instructions comprises further instructions to generate the computer application program command based on the utterance representation and based on the analysis of the ambiguous information.

19. The computer program product of claim 14, wherein each goal-directed rule comprises a set of conditions and a set of actions, each condition consisting of a first proposition or a first script command and each action consisting of a second proposition or a second script command.

20. An apparatus for converting an utterance representation into a response, comprising:
means for generating an application specific goal derived from the utterance representation, wherein the application specific goal and the utterance representation are propositions comprising attribute-object-value triples, the proposition corresponding to the utterance representation being derived from a frame representation;
means for analyzing the utterance representation based on the application specific goal and a corresponding set of goal-directed rules to identify ambiguous information in the utterance representation or to generate a subgoal, each goal-directed rule representing a valid inference step from the goal-directed rule's condition to the application specific goal that may be taken in a domain associated with the application specific goal; and
means for generating a response based on the analysis of the utterance representation if ambiguous information is identified.

* * * * *